United States Patent [19]

Stollenwerk et al.

[11] Patent Number: 4,838,910
[45] Date of Patent: Jun. 13, 1989

[54] AIR DRIVEN FILTRATION SYSTEM

[75] Inventors: William R. Stollenwerk; Paul A. Burns, both of Houston, Tex.

[73] Assignee: Critical Systems, Inc., Houston, Tex.

[21] Appl. No.: 98,614

[22] Filed: Sep. 18, 1987

[51] Int. Cl.$^4$ ............................................. B01D 50/00
[52] U.S. Cl. ...................................... 55/385.2; 55/467; 55/472; 55/493; 55/500; 55/505
[58] Field of Search ................. 55/467, 468, 471, 472, 55/480, 485, 482, 270, 383, 422, 385 A, 493, 502, 503, 500, 505–507

[56] References Cited

U.S. PATENT DOCUMENTS

| | | | |
|---|---|---|---|
| 1,916,907 | 7/1933 | Sargent | 55/482 X |
| 2,019,213 | 10/1935 | Dahlman | 55/480 |
| 2,240,368 | 4/1941 | Le Fevre | 55/493 X |
| 2,637,540 | 5/1953 | Rowe | 55/471 X |
| 3,176,447 | 4/1965 | Omohundro et al. | 55/472 X |
| 3,295,359 | 1/1967 | Peck | 55/270 X |
| 3,672,129 | 6/1972 | Strople et al. | 55/270 |
| 3,766,844 | 10/1973 | Donnelly et al. | 55/385 A X |
| 3,828,530 | 8/1974 | Peters | 55/507 X |
| 3,861,894 | 1/1975 | Marsh | 55/493 X |
| 3,976,450 | 8/1976 | Marcote et al. | 55/270 X |
| 4,121,916 | 10/1978 | Fricke | 55/472 X |
| 4,388,087 | 6/1983 | Tipton | 55/472 X |
| 4,597,781 | 7/1986 | Spector | 55/503 X |
| 4,604,111 | 8/1986 | Natale | 55/467 X |

FOREIGN PATENT DOCUMENTS

| | | | |
|---|---|---|---|
| 655121 | 4/1929 | France | 55/493 |
| 73023 | 4/1984 | Japan | 55/383 |

OTHER PUBLICATIONS

"Series 800 Asbestos Vacuum Systems for Safe Control & Removal of Asbestos and Other Toxic Materials", Hako Minuteman, Inc., Addison, Ill., Bulletin No. 987821, 5-86.

*Primary Examiner*—Charles Hart
*Attorney, Agent, or Firm*—Gunn & Nichols

[57] ABSTRACT

An air driven filtration system is disclosed. The system includes a power module housing, an air driven motor and a removable filter pack. The power module is adapted to receive an intake adapter for connecting a remote filter pack thereto which may be placed in a contaminated work area. The remote filter pack is connected to the power module by flexible ducting.

12 Claims, 3 Drawing Sheets

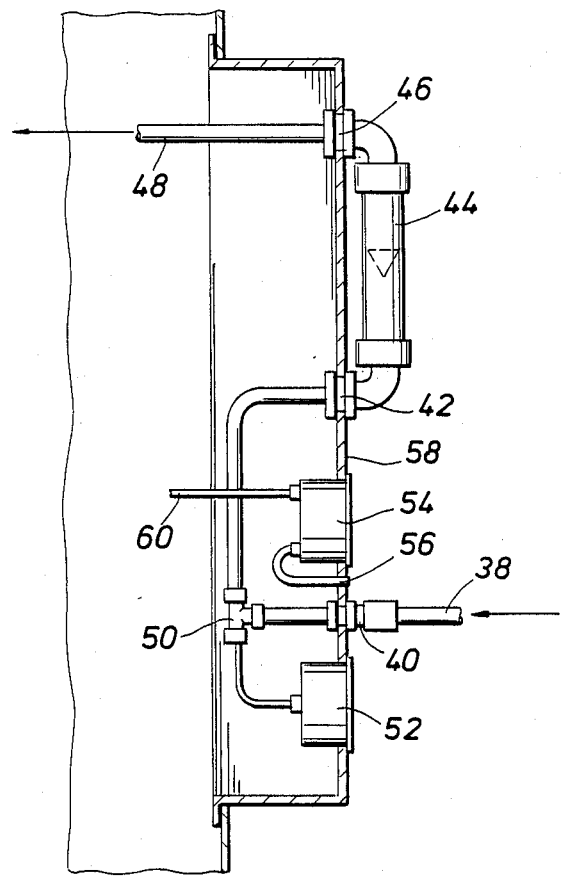
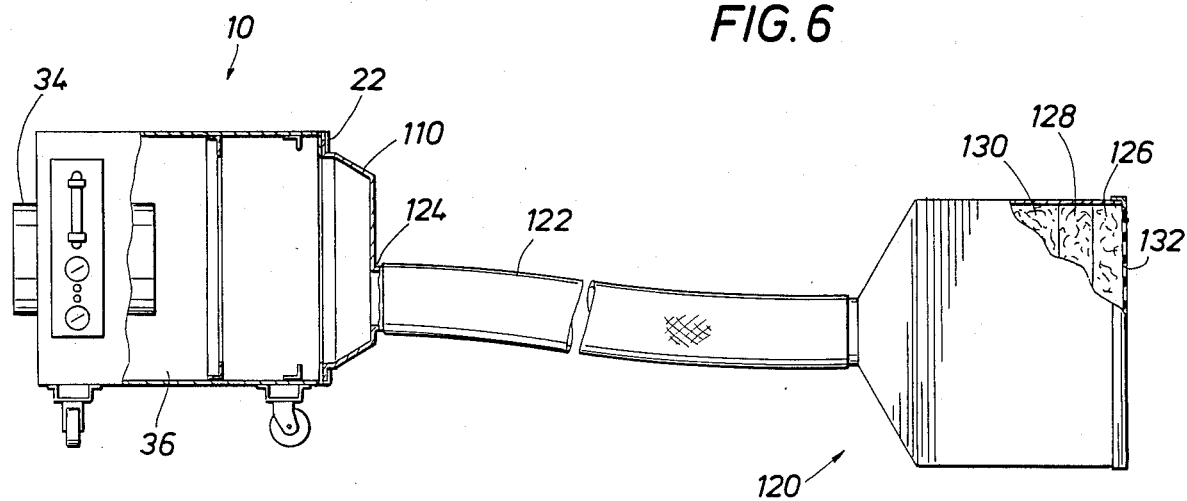

AIR DRIVEN FILTRATION SYSTEM

BACKGROUND OF THE INVENTION

The present invention is directed to an improved filtration system for removal of contaminants, particularly, an air driven filtration system used for ventilation and removal of contaminated particulates from hazardous work areas.

When working in a hazardous and confined environment, it is desirable to protect the outside environment and the workers working in the hazardous environment. This invention is particularly useful in areas which require the removal and filtration of large volumes of air from the hazardous work area. Highly contaminated work areas such as removal of asbestos from a building, industrial cleaning, toxic waste removal, confined areas having large accumulations of dust, etc. require the efficient removal and filtration of air to remove the hazardous particulates present in the work area.

Air filtration systems have been used in hazardous work areas for some time. U.S. Pat. No. 4,604,111 to Anthony Natale describes a filtration device and method for removing particulate contamination from a contaminated area. The Natale system establishes a negative air pressure within an enclosed space. The enclosed space is provided with an inlet and an outlet. The filter means is positioned in advance of the outlet so that air is drawn into the enclosed space through the inlet and expelled from the enclosed space through the filter means and out the outlet. A seal means is provided for sealing the inlet against air exiting from the enclosed space to the exterior in the event of loss of negative air pressure in the enclosed space. Other similar type filtration systems incorporating filter mediums have been described in various U.S. Patents and Publications.

The prior art devices, however, have a number of disadvantages which limit their ability to efficiently filter air from areas not specifically designed or falling within a size range adapted to the capabilities of the filtration device. In addition, conventional filtration devices are powered by electric motors which are not suitable for some hazardous environments. For example, in some environments electric motors may present a fire or explosion hazard. In high-temperature environments, electric motors might be adversely affected and not operate properly. Electric motor filtration devices are also preset for operational parameters. Typically, the motor speed will be preset so that an operator may select the motor speed of the filtration system to run at high, medium or low. The speed of the motor will effect the rate at which the filtration device will pull air through the contaminated enclosure. Difficulties may be encountered in matching the filtration system motor speed with the size of the enclosed hazardous area to remove air therethrough at the desired air flow rate.

It is an object of the present invention to provide an air filtration system which is air driven for use in all types of hazardous environments, including high temperature environments and environments which may be susceptible to fire or explosion.

It is another object of the present invention to provide an air drive filtration system having an adjustable air flow rate so that the filtration system air flow rate may be adjusted to the size of the hazardous enclosure to establish an optimum air flow rate through the enclosure.

It is yet another object of the present invention to provide an air driven filtration system including a power module having at least one remote filter pack which may be placed within a contaminated area. The filter pack is connected to the power module by flexible ducting and is completely disposable.

It is a further object of the present invention to provide an air filtration system requiring no cleaning of the contaminated remote filter pack thereby minimizing exposure of the workers to contaminated material.

It is an additional object of the present invention to provide an air infiltration system equipped with remote filter packs enabling the removal and filtration of contaminants in areas which are difficult to access.

SUMMARY OF THE INVENTION

The invention of the present disclosure is directed to an air driven filtration system. The system includes a power module having an air driven motor and a removable filter pack. The system includes an intake adapter which may be mounted to the power module for connection to flexible ducting having a remote filter pack connected to an end of the flexible ducting. The remote filter pack includes a three stage filter pack assembly sealed within a disposable housing.

BRIEF DESCRIPTION OF THE DRAWINGS

So that the manner in which the above recited features, advantages and objects of this invention as well as others which will become apparent are attained and can be understood in detail, a more particular description of the invention, briefly summarized above, may be had by reference to the embodiments thereof that are illustrated in the appended drawings, which drawings form a part of this specification.

It is to be noted, however, that the appended drawings illustrate only typical embodiments of this invention and are therefore not to be considered limiting of its scope, for the invention may admit to other equally effective embodiments.

FIG. 5 is a partially broken away, sectional view of the instrumentation panel on the power module of the invention taken along line 5—5 of FIG. 1; and FIG. 6 is an elevation view showing the power module of the invention connected to a remote filter pack assembly by flexible ducting.

DETAILED DESCRIPTION OF THE PREFERRED EMBODIMENT

Figure 1:
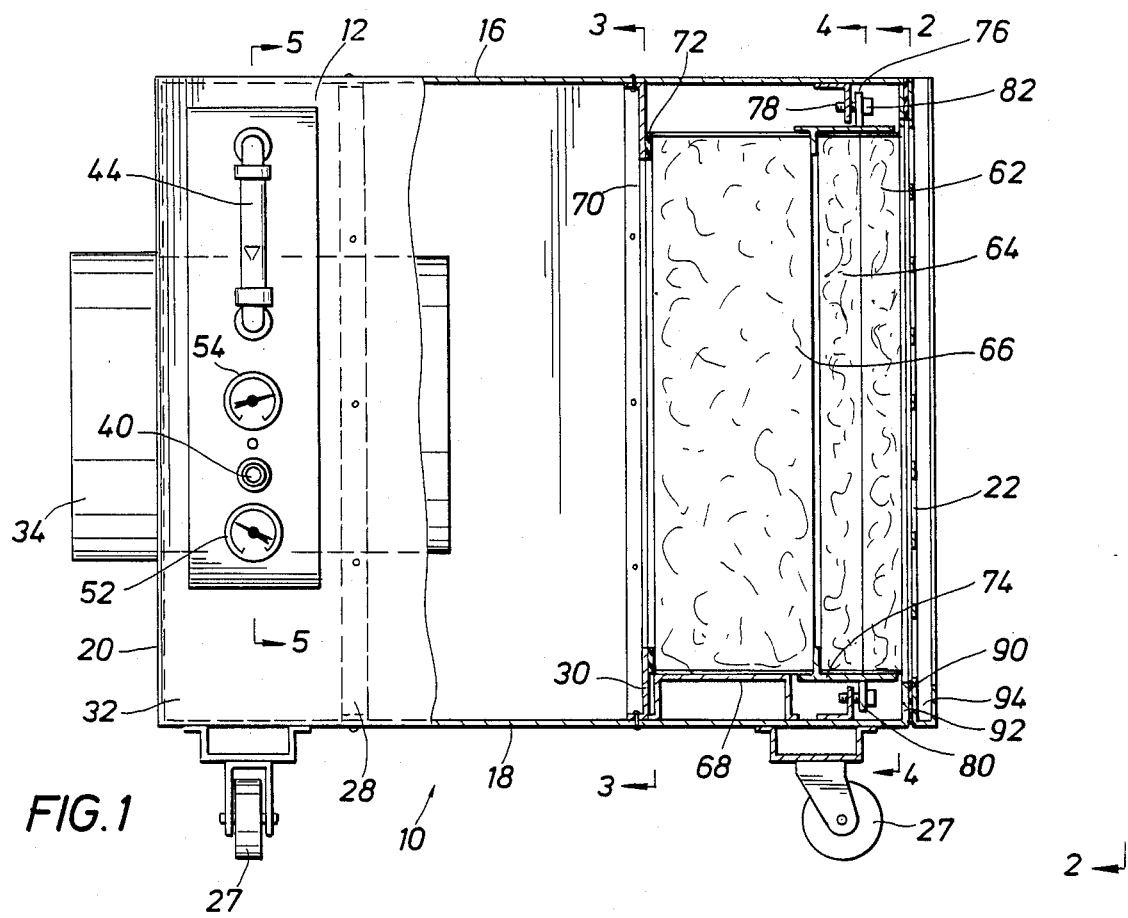
FIG. 1 is a partially broken away, sectional view of the power module of the invention.

Referring first to FIG. 1, the power module of the invention is shown and generally identified by the reference numeral 10. The power module 10 defines an enclosed housing formed by sidewalls 12 and 14, a top wall 16 and a bottom wall 18 joined together to form a substantially rectangular shaped housing. The power module 10 is closed at the discharge end of the power module 10 by a discharge plate 20. The intake end of the power module 10 is closed by a door 22 mounted to the sidewalls 14 by a continuous hinge 24. The door 22 has a grid pattern of openings 26 for permitting air to pass therethrough. The door 22 of the power module 10 opens outwardly by unlatching a pair of latches (not shown in the drawings) mounted on the sidewall 12. The power module 10 is very mobile and may be moved about a site easily on four heavy-duty swivel casters 27 mounted to the bottom 18 of power module 10.

The power module 10 defines a chamber which is partitioned by a fan bulkhead 28 and a filter bulkhead 30. The fan bulkhead 28 extends across the chamber of the power module 10 substantially parallel and spaced from the discharge plate 20 defining a fan motor chamber 32 therebetween. The discharge plate 20 and fan bulkhead 28 are provided with centrally located aligned openings for receiving the fan motor housing 34 therethrough. As shown in FIG. 1, the fan motor housing 34 is substantially cylindrical in shape having one end which projects outwardly from the discharge plate 20 and an opposite end which projects outwardly from the fan bulkhead 28 into the plenum chamber 36 of the power module 10. The fan motor housing 34 houses an air driven blower such as a Coppus RF 16. The junction between the housing 34 and the aligned openings in the discharge plate 20 and fan bulkhead 28 is sealed so that air drawn through the power module 10 must pass through the fan motor housing 34.

The air driven motor within the housing 34 is powered by compressed air applied to the motor via a hose 38 connected to an inlet port 40. Internal piping, a shown in FIG. 5, connects the compressed air supply to the inlet port 42 of a valve and flow meter 44. The air supply is directed through the flow meter 44 out an outlet port 46 through piping 48 which is connected to the air driven motor. The inlet port 40 is also connected via a T-connection 50 to a pressure gauge 52 to monitor the pressure of the incoming compressed air. A helic gauge 54 monitors the pressure drop across the filters housed within the power module 10. The helic gauge 54 is provided with a first conduit 56 which opens to atmospheric pressure through the control panel 58. A second conduit 60 connected at the one end to the helic gauge 54 extends through the fan bulkhead 28 and opens into the plenum chamber 36.

Referring again to FIG. 1, the filter pack of the invention is a three-stage filter assembly including a primary filter 62 which is a low deficiency polyolefin pad approximately one inch thick. A secondary filter 64 is in facing contact with the primary filter 62. The secondary filter 64 is a medium efficiency, extended surface, pleated panel filter. The filter pack assembly is completed by a HEPA (High Efficiency Particulate Air) filter 66. The HEPA filter 66 rests on a pair of angular shims 68 which are mounted on the bottom wall 18. The angular shims 68 position the HEPA filter 66 so that it covers a substantially square opening 70 formed in the filter bulkhead 30. The opening 70 is circumscribed by a seal 72 which is engaged by the HEPA filter 66 when mounted within the power module housing forming a seal between the HEPA filter 66 and the filter bulkhead 30, thereby insuring that contaminated air does not flow past the HEPA filter 66 and discharge into the environment.

A filter frame 74 fits about the forward end of the HEPA filter 66. The filter frame 74 is centrally mounted within the power module 10 on brackets welded or otherwise mounted within the power module housing. The L-shaped brackets 76 have threaded bolts 78 projecting through a leg of each of the brackets 76 toward the forward end of the power module housing and are centrally located on the interior of the sides 12 and 14, top wall 16 and bottom wall 18. The filter frame 74 is provided with tabs 80 which extend outwardly from the filter frame 74 and are positioned to cooperate with the brackets 78 for mounting the filter frame 74 within the power module housing. The tabs 80 are provided with an aperture for receiving the bolt 76 therethrough. The filter frame 74 is secured to the brackets 78 by nuts 82 which are threaded on the bolts 76.

Figure 4:
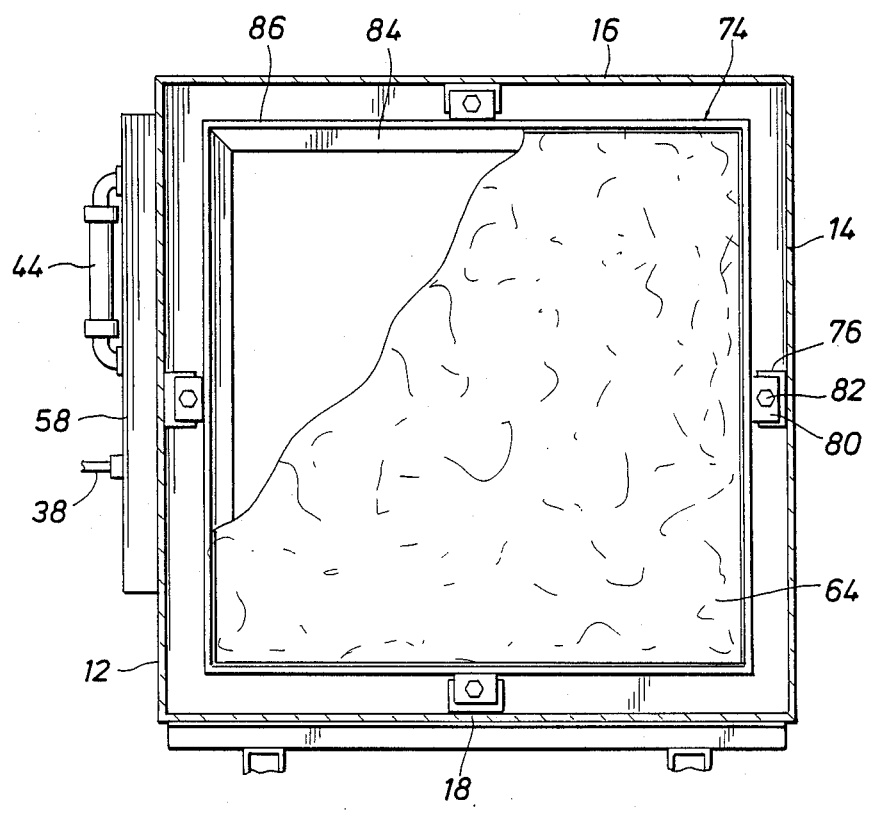
FIG. 4 is a partially broken away, sectional view of the power module of the invention taken along 4—4 of FIG. 1.

Referring now to FIG. 4 the positioning of the filter frame 74 within the power module housing is more clearly shown. It will be observed that the filter frame 74 circumscribes a substantially square opening which is aligned with the opening 70 in the filter bulkhead 30. The filter frame 74 is a perimeter frame which engages the perimeter edges of the filters 62, 64 and 66. It is an extruded metal member which is substantially T-shaped in cross-section. The filter frame 74 includes a flat planar member 84 extending inwardly and at right angle to a surrounding member 86. The members 84 and 86 define outwardly opening receptacles for receiving and retaining the filter components. As shown in FIG. 1, a portion of the member 86 extends at a right angle from the back side of the member 84 a short distance so that it fits about and encloses the forward portion of the HEPA filter 66. A portion of the member 86 likewise projects from the forward side of the member 84 to define a rectangular receptacle for receiving the primary and secondary filters 62 and 64 therein. It will be observed that the primary and secondary filters 62 and 64 are in facing contact.

Referring again to FIGS. 1 and 2, the forward or intake end of the power module 10 is provided with a door 22 which, when it is closed, contacts the flat face of the primary filter 62 providing a slight compressive force against the filter assembly. A perimeter seal 90 is provided about the internal edge of the door 22 for engagement with an inwardly extending flange 92 of the power module housing which defines the filter pack opening into the power module 10. The seal 92 forms a perimeter seal about the filter pack opening so that air drawn through the power module 10 passes through the grid openings 26 of the door 22 and through the filters 62, 64 and 66. The filter pack assembly is therefore housed within the sealed housing of the power module 10 so that contaminants in the incoming air are filtered out by the three stage filter pack assembly and only clean air is discharged to the surrounding environment at the discharge end of the power module 10.

Figure 2:
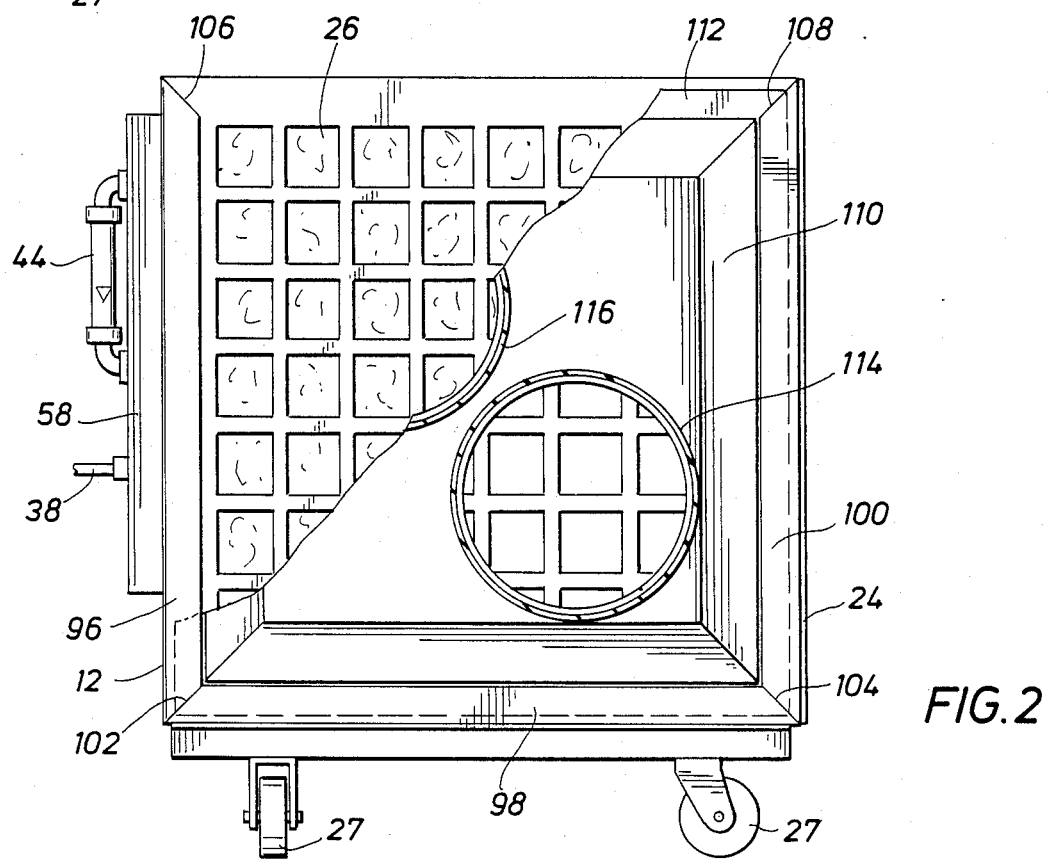
FIG. 2 is a partially broken away, front view of the power module of the invention showing an intake adapter mounted thereon.
Figure 3:
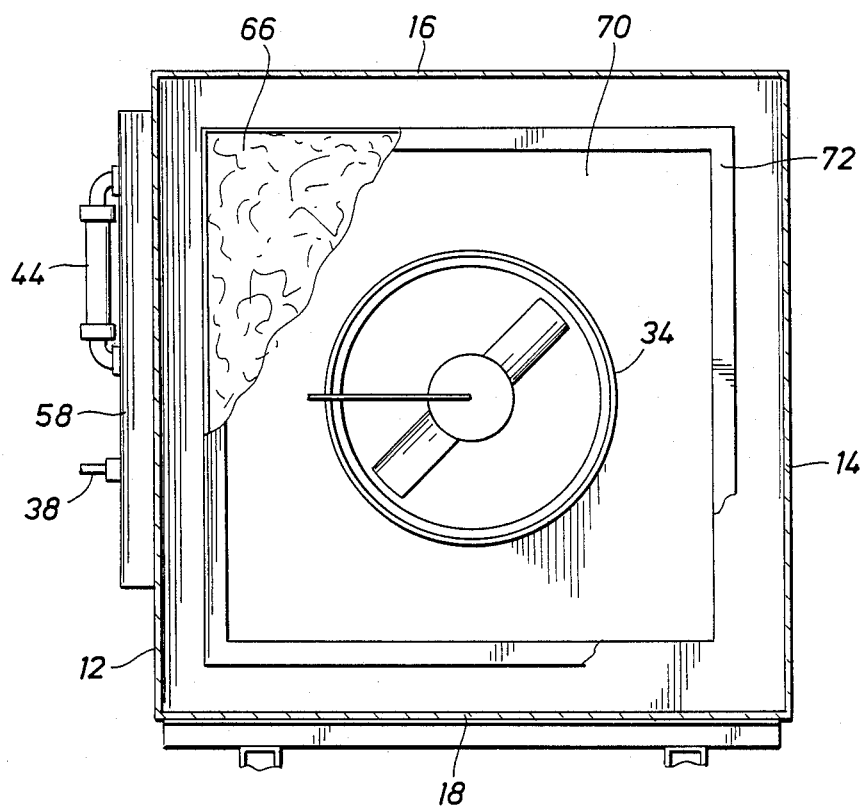
FIG. 3 is a partially broken away, sectional view of the power module of the invention taken along line 3—3 of FIG. 1.

It will be observed that the door 22, as shown in FIG. 2, includes a channel 94 formed by flange members 96, 98 and 100 which have been folded over on the external surface of the door 22 to form the channel 94. The flange members 96, 98 and 100 may be flap extensions of the sides and bottom of the door 22 which are cut, folded over and spot welded at the corners 102 and 104. The flange members 96 and 100 at the upper ends thereof are cut inwardly at an angle at 106 and 108 for guiding the fan intake adapter into the channel 94.

In FIG. 2, the intake adapter 110 is shown mounted to the door 22. The intake adapter 110 includes an integral peripheral extension 112 which is flat and sized to be received within the channel 94. Mounting of the intake adapter 110 to the door 22 is accomplished by sliding the intake adapter 110 down into the channel 94 so that it bottoms therein and is retained by the flanges 96, 98 and 100 which substantially enclose the peripheral extension 112.

The intake adapter 110 may be provided with one or two cylindrical flanges for connection to a flexible ducting. In the embodiment shown in FIG. 2, the intake adapter 110 is provided with two twelve inch diameter flanges 114 and 116. The flanges 114 and 116 project from the surface of the intake adapter 110 a sufficient distance permitting flexible ducting to be slid about the flanges 114 and 116 and connected thereto by clamps, tie bands, or the like. The flexible ducting is connected to a remote filter pack which may be placed within a contaminated area, particularly a contaminated area that is not easily accessible.

Referring now to FIG. 6, the remote filter embodiment of the invention is shown. When a remote filter is used with the power module 10, the filter assembly housed within the power module 10, as shown in FIG. 1, is removed from the power module 10 and the intake adapter 110 is mounted on the door 22. The power module 10 is connected to a remote filter module 120 by flexible ducting 122. The flexible ducting 122 is connected to the intake adapter 110 about the projecting cylindrical flange 124. In the embodiment of FIG. 6, the intake adapter 110 includes a single projecting cylindrical flange 124. It is understood however, as shown in FIG. 2, that the intake adapter 110 may be provided with one or more flange connectors so that multiple remote modules 120 may be connected to the power module 10.

The remote module 120 houses a three stage filter assembly including a primary filter 126, a secondary filter 128 and a HEPA filter 130. The remote filter module 120 is constructed to be a totally disposable unit. The HEPA filter 130 is permanently housed within the remote filter housing. The primary and secondary filters 126 and 128 may be removed and replaced as needed. The primary and secondary filters 126 and 128 are incorporated in the filter assembly to filter out the large and medium sized particles. It is anticipated that the primary and secondary filters will be fully loaded several times prior to the full loading of the HEPA filter 130 which is incorporated in the remote module 120 to filter out particle sizes in the range of 0.3 microns. The primary and secondary filters 126 and 128 may be replaced by removing the grid cover 132 from the intake end of the remote module 120. The grid cover 132 is mounted to the remote module 120 by screws which are easily and unquickly unthreaded to permit access to the interior of the remote module 120. The contaminated primary and secondary filters 126 and 128 are removed and placed in hazard waste containers for subsequent disposal. New primary and secondary filters are placed within the remote module 120 and the cover 132 is replaced thereon. The primary and secondary filters may be replaced in a matter of minutes so that exposure of the worker to the contaminated particles is minimized.

In the embodiment of FIG. 6, only the remote filter module 120 is placed within the contaminated area. The power module 10 is outside the contaminated area and not exposed to the contaminants. The cleaning requirements for the power module 10 are thereby markedly reduced so that the power module 10 may be moved to another site without extensive cleaning or decontamination.

The air driven filtration system of the present disclosure is adapted for use in filtering air flow through contaminated areas to provide a relatively safe environment for the workers working in the contaminated area. The present system, however, is particularly useful in work areas having high temperatures or when danger of fire or explosion exists. The system of the present disclosure does not include electrical components such as motors, switches or other temperature sensitive components so that it will operate successfully in those work areas having special requirements. The air motor housed within the power module 10 of the present disclosure permits minute adjustments to be made so that the speed of the air motor, and thereby the air flow rate through the power module 10, may be adjusted to match the size of the work area to be evacuated so that the air flow rate through the work area is maintained at an appropriate level to minimize the exposure of the workers to the contaminants.

It will be understood that certain combinations and sub combinations are of utility and may be employed without reference to other features and sub combinations. This is contemplated by and is within the scope of the present invention.

As many possible embodiments may be made of this invention without departing from the spirit and scope thereof, it is to be understood that all matters hereinabove set forth or shown in the accompanying drawings are to be interpreted as illustrative and not in any limiting sense.

While the foregoing is directed to the preferred embodiment, the scope thereof is determined by the claims which follow.

What is claimed is:

1. An air filtration apparatus for removing particulate contaminants from an enclosed work area, comprising:
   (a) an air filtration housing defining a conduit for air flow through said filtration housing wherein said filtration housing includes a door hingedly mounted at the inlet end thereof, said door including a plurality of openings in a grid pattern for permitting air to flow through said filtration housing upon closing and latching said door to said housing, said door further including a channel formed on the exterior thereof, said channel extending along vertical sides and a bottom side of said door for receiving and retaining an intake adapter selectively mounted on said door;
   (b) filter means mounted within said filtration housing at an inlet end thereof for filtering particulate contaminants from the air flow drawn through said filter means;
   (c) air driven motor means mounted within said filtration housing at an outlet end thereof, said motor means including a fan driven by said motor means for drawing air from the work area and through said filtration housing;
   (d) a plenum chamber located within said filtration housing separating said filter means and said motor means; and
   (e) said filtration housing including an air inlet port for connection to an air supply source for operating said motor means.

2. The apparatus of claim 1 wherein said motor means is supported by a fan bulkhead within said filtration housing in axial alignment with said filter means.

3. The apparatus of claim 2 wherein said filter means comprises a three stage filter assembly including primary, secondary and HEPA filters, said filters being mounted within said filtration housing in planar facing contact.

4. The apparatus of claim 1 including a continuous seal means located interiorly adjacent the peripheral edge of said door for sealing engagement with said filtration housing upon closing said door.

5. The apparatus of claim 3 wherein said filtration housing includes a filter bulkhead mounted transversely in said filtration housing, said filter bulkhead including an opening therethrough circumscribed by seal means, the HEPA filter being mounted within said filtration housing in sealing engagement with said sealing means for forming a seal about the opening in the filter bulkhead.

6. The apparatus of claim 3 wherein said filter assembly includes a filter frame defining oppositely facing receptacles sized to receive said filters for axially positioning said filters within said filtration housing.

7. The apparatus of claim 6 wherein said filter frame is demountably concentrically positioned within said filtration housing.

8. The apparatus of claim 1 including an air flow meter mounted to said filtration housing for monitoring the flow of air supplied to said motor means.

9. An air filtration apparatus for removing particulate contaminants from an enclosed work area comprising:

(a) a housing defining a conduit for air flow through said housing;

(b) remote filter means housed within a remote filter housing for filtering particulate contaminants from the air flow drawn through said remote filter means wherein said remote filter means is separable from said housing and disposable after use;

(c) flexible ducting connecting said remote filter means to said housing;

(d) air driven motor means mounted within said housing at an outlet end thereof, said motor means including a fan driven by said motor means for drawing air from the work area through said remote filter means and said housing; and (e) said housing including an air inlet port for connection to an air supply for operating said motor means.

10. The apparatus of claim 9 wherein said remote filter means comprises a three stage filter assembly including primary, secondary and HEPA filters housed within said remote filter housing, said HEPA filter being permanently mounted within said remote filter housing.

11. The apparatus of claim 10 wherein said primary and secondary filters are removably mounted within said remote filter means.

12. The apparatus of claim 9 wherein said remote filter housing includes a removable grid cover permitting air flow through said remote filter housing.

* * * * *